US010377275B2

(12) United States Patent
Ketels et al.

(10) Patent No.: US 10,377,275 B2
(45) Date of Patent: Aug. 13, 2019

(54) MOTION SICKNESS MITIGATION

(71) Applicant: Faurecia Automotive Seating, LLC, Auburn Hills, MI (US)

(72) Inventors: Cedric Ketels, Holland, MI (US); Rod Goodrich, Watervliet, MI (US); Matthew K. Benson, Holland, MI (US); Alfred H. Bransdorfer, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 15/856,341

(22) Filed: Dec. 28, 2017

(65) Prior Publication Data
US 2019/0202324 A1  Jul. 4, 2019

(51) Int. Cl.
*B60N 2/42* (2006.01)
*B60N 2/427* (2006.01)
*B60N 2/50* (2006.01)
*B60N 2/54* (2006.01)
*B60N 2/68* (2006.01)
B60N 2/52 (2006.01)

(52) U.S. Cl.
CPC ............. *B60N 2/504* (2013.01); *B60N 2/682* (2013.01); *B60N 2/525* (2013.01); *B60N 2/544* (2013.01)

(58) Field of Classification Search
CPC ........ B60N 2/504; B60N 2/525; B60N 2/544; B60N 2/682
USPC ........ 297/216.1–216.16, 313, 314, 273, 277, 297/260.1
See application file for complete search history.

(56) References Cited

U.S. PATENT DOCUMENTS

| 3,144,695 | A | | 8/1964 | Budwig | |
|---|---|---|---|---|---|
| 3,341,903 | A | | 9/1967 | Buntic | |
| 3,632,076 | A | * | 1/1972 | Rogers, Jr. | ............... B60N 2/39 248/371 |
| 4,324,414 | A | | 4/1982 | Wilkes | |
| 4,432,525 | A | * | 2/1984 | Duvall | .................... B63B 29/04 297/314 X |
| 4,500,062 | A | * | 2/1985 | Sandvik | ................... B60N 2/39 297/314 X |
| 4,515,337 | A | * | 5/1985 | Torras | ...................... B60N 2/39 297/314 X |

(Continued)

FOREIGN PATENT DOCUMENTS

| CA | 2125642 | 12/1994 |
|---|---|---|
| CN | 1618654 | 5/2005 |

(Continued)

OTHER PUBLICATIONS

German Office Action for German App. No. 10 2016 123 681.0 dated Oct. 19, 2017, 601-666 DE, 5 pages, (no English translation available).

(Continued)

*Primary Examiner* — Rodney B White
(74) *Attorney, Agent, or Firm* — Barnes & Thornburg LLP

(57) ABSTRACT

An occupant support adapted for use in a vehicle includes a seat frame, a seat pad, and a suspension system. The seat frame is adapted to couple with the vehicle for movement with the vehicle. The seat pad is adapted to provide a comfortable support interface. The suspension system provides relative movement between the seat pad and the seat frame.

17 Claims, 9 Drawing Sheets

(56) References Cited

U.S. PATENT DOCUMENTS

| | | | |
|---|---|---|---|
| 4,685,730 A | 8/1987 | Linguanotto | |
| 4,869,554 A | 9/1989 | Abu-Isa | |
| 4,883,320 A | 11/1989 | Izumida | |
| 5,013,086 A | 5/1991 | Benzur | |
| 5,368,118 A | 11/1994 | Hoefle | |
| 5,393,126 A | 2/1995 | Boulva | |
| 5,558,399 A | 9/1996 | Serber | |
| 5,582,381 A | 12/1996 | Graf | |
| 5,769,490 A | 6/1998 | Falzon | |
| 5,976,097 A * | 11/1999 | Jensen | A47C 7/024 297/330 |
| 5,992,933 A * | 11/1999 | West | B60N 2/39 297/313 |
| 6,068,280 A * | 5/2000 | Torres | A61G 5/045 297/314 X |
| 6,793,289 B2 | 9/2004 | Kuster | |
| 6,814,407 B2 | 11/2004 | Mundell | |
| 7,044,553 B2 * | 5/2006 | Ropp | B60N 2/508 297/313 |
| 7,063,386 B2 * | 6/2006 | Dowty | B60N 2/62 297/313 X |
| 7,083,233 B2 | 8/2006 | Massara | |
| 7,281,749 B2 * | 10/2007 | Yamada | B60N 2/0244 297/314 X |
| 7,334,758 B2 | 2/2008 | Williamson | |
| 7,338,126 B2 * | 3/2008 | Ropp | B60N 2/508 297/313 |
| 7,481,493 B2 | 1/2009 | Fujita | |
| 7,490,572 B2 | 2/2009 | Grober | |
| 7,506,910 B2 * | 3/2009 | Leitner | B60N 2/0232 296/65.01 |
| 7,517,024 B2 | 4/2009 | Cvek | |
| 7,575,206 B2 | 8/2009 | Meier | |
| 7,722,526 B2 | 5/2010 | Kim | |
| 7,731,294 B2 | 6/2010 | Yasuda | |
| 7,841,662 B2 | 11/2010 | Samain | |
| 7,971,939 B2 | 7/2011 | Fujita | |
| 8,020,933 B2 | 9/2011 | Kim | |
| 8,100,471 B2 * | 1/2012 | Lawall | B60N 2/4279 297/216.1 |
| 8,340,869 B2 | 12/2012 | Wakita | |
| 8,662,585 B2 * | 3/2014 | Garvis | G09B 9/12 297/314 |
| 8,684,460 B2 | 4/2014 | Weir, III | |
| 8,690,750 B2 | 4/2014 | Krueger | |
| 8,840,186 B2 | 9/2014 | Samain | |
| 8,911,015 B2 | 12/2014 | Cohen | |
| 9,045,058 B2 * | 6/2015 | Katoh | B60N 2/80 |
| 9,193,280 B2 | 11/2015 | McMillen | |
| 9,193,287 B2 | 11/2015 | McMillen | |
| 9,242,581 B2 * | 1/2016 | Farooq | B60N 2/14 |
| 9,272,643 B2 * | 3/2016 | Nagayasu | B60N 2/643 |
| 9,428,083 B2 | 8/2016 | Lehner | |
| 9,494,940 B1 | 11/2016 | Kentley | |
| 9,517,777 B2 | 12/2016 | Hall | |
| 9,550,440 B2 * | 1/2017 | Nagayasu | B60N 2/7094 |
| 9,561,741 B2 * | 2/2017 | Nagayasu | B60N 2/14 |
| 9,604,560 B1 | 3/2017 | Ellis | |
| 9,682,682 B2 * | 6/2017 | Aoki | B60R 22/20 |
| 9,713,380 B2 * | 7/2017 | Gehner | A47C 7/14 |
| 9,751,434 B2 | 9/2017 | Sugiyama | |
| 9,802,513 B2 * | 10/2017 | Katoh | A47C 1/024 |
| 9,950,646 B2 * | 4/2018 | Katoh | B60N 2/666 |
| 9,975,458 B2 * | 5/2018 | Takeuchi | B60N 2/39 |
| 2002/0060493 A1 | 5/2002 | Nishino | |
| 2002/0135214 A1 * | 9/2002 | Ursel | B60N 2/0232 297/330 |
| 2003/0116999 A1 | 6/2003 | Fujita | |
| 2004/0245824 A1 | 12/2004 | McMillen | |
| 2005/0179294 A1 * | 8/2005 | Dowty | B60N 2/62 297/313 X |
| 2006/0055214 A1 | 3/2006 | Serber | |
| 2006/0138831 A1 | 6/2006 | McMillen | |
| 2007/0080013 A1 | 4/2007 | Melz | |
| 2008/0023995 A1 | 1/2008 | Ott | |
| 2009/0115234 A1 | 5/2009 | Samain | |
| 2010/0268133 A1 | 10/2010 | Samain | |
| 2013/0175838 A1 | 7/2013 | Oshima | |
| 2015/0105641 A1 | 4/2015 | Austin | |
| 2015/0266448 A1 * | 9/2015 | Aoki | B60R 22/20 297/313 |
| 2015/0343924 A1 * | 12/2015 | Takeuchi | B60N 2/39 297/314 |
| 2016/0096450 A1 | 4/2016 | Kondrad | |
| 2016/0159254 A1 * | 6/2016 | Katoh | A47C 1/024 297/313 |
| 2016/0243967 A1 | 8/2016 | Seibold | |
| 2017/0129373 A1 | 5/2017 | Knox | |
| 2018/0222518 A1 | 8/2018 | Hill | |

FOREIGN PATENT DOCUMENTS

| | | |
|---|---|---|
| CN | 101274604 | 10/2008 |
| CN | 104758153 | 7/2015 |
| DE | 10041910 | 1/2002 |
| DE | 102004058503 | 1/2006 |
| DE | 102009048902 | 4/2011 |
| DE | 102011109470 | 2/2012 |
| DE | 102011009211 A1 | 7/2012 |
| DE | 102015117980 | 5/2016 |
| EP | 0185388 A1 | 6/1986 |
| EP | 1193117 | 4/2002 |
| EP | 1663727 | 6/2006 |
| FR | 2061931 | 6/1971 |
| FR | 2776583 | 10/1999 |
| GB | 1330683 A | 9/1973 |
| GB | 8816607 | 8/1988 |
| GB | 2206787 | 1/1989 |
| GB | 2206787 B | 1/1989 |
| GB | 2407028 | 4/2005 |
| GB | 201307595 | 6/2013 |
| JP | 2003299231 A | 10/2003 |
| WO | 2004026080 | 4/2004 |
| WO | 2005025945 | 3/2005 |
| WO | 2005037020 | 4/2005 |
| WO | 2005094632 | 10/2005 |
| WO | 2006083158 | 8/2006 |
| WO | 2006095455 A1 | 9/2006 |
| WO | 2016197068 | 12/2016 |

OTHER PUBLICATIONS

Extended European Search Report for European App. No. 17206306.7 dated May 14, 2018, 4175 EP II 5 pages.

Office Action dated Apr. 19, 2019 for U.S. Appl. No. 15/852,010, 4552 US-U II, pp. 1-6.

* cited by examiner

MOTION SICKNESS MITIGATION

BACKGROUND

The present disclosure relates to occupant supports, and particularly to occupant supports including a seat. More particularly, the present disclosure relates to occupant supports adapted for use in vehicles.

SUMMARY

According to the present disclosure, an occupant support is configured to mount to a floor of a vehicle. The occupant support includes a seat frame coupled to the vehicle for movement with the vehicle and a seat pad coupled to the seat frame. The seat pad is adapted to support the occupant of the occupant support on a support surface above the floor of the vehicle.

In illustrative embodiments, the occupant support further includes means for facilitating relative movement between the support surface of the seat pad and the seat frame in response to an acceleration of the seat frame to reduce the peak magnitude of acceleration of the occupant during acceleration of the seat frame so that motion sickness experienced by the occupant is minimized. The means is configured to reduce the peak of magnitude of at least one of a lateral acceleration and a fore-and-aft acceleration of the occupant during the acceleration of the seat frame.

In illustrative embodiments, the means includes a suspension system. The suspension system provides relative movement between the seat pad and the seat frame. The suspension system includes a backing coupled with the seat pad for movement with the seat pad and a suspension-control unit coupled to the seat frame and the backing. The backing is free to rotate with the seat pad relative to the seat frame in response to an acceleration of the seat frame.

In illustrative embodiments, the backing includes a bottom support and a back support coupled to the bottom support to extend upwardly away from the bottom support. The bottom support and the back support are integrally formed and flexible. The bottom support is coupled with the seat frame at a pivot point about which the backing rotates relative to the seat frame. The suspension-control unit includes a bias-member unit coupled with the seat frame and the back support included in the backing.

In illustrative embodiments, the suspension-control unit includes a first guide track, a second guide track, and a guide unit. The first guide track is formed in the backing. The second guide track is formed in the seat frame. The guide unit extends into the first guide track and the second guide track to allow the backing to rotate relative to the seat frame along paths defined by the first guide track and the first second track.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 12 is a front elevation view of the occupant support of FIG. 9 showing that the first guide pin included in the suspension system extends into the first guide track formed in the backing and the second guide track formed in the seat frame and suggesting that during a right turn the seat pad is configured to move relative to the seat frame in the.

DETAILED DESCRIPTION

Figure 1:
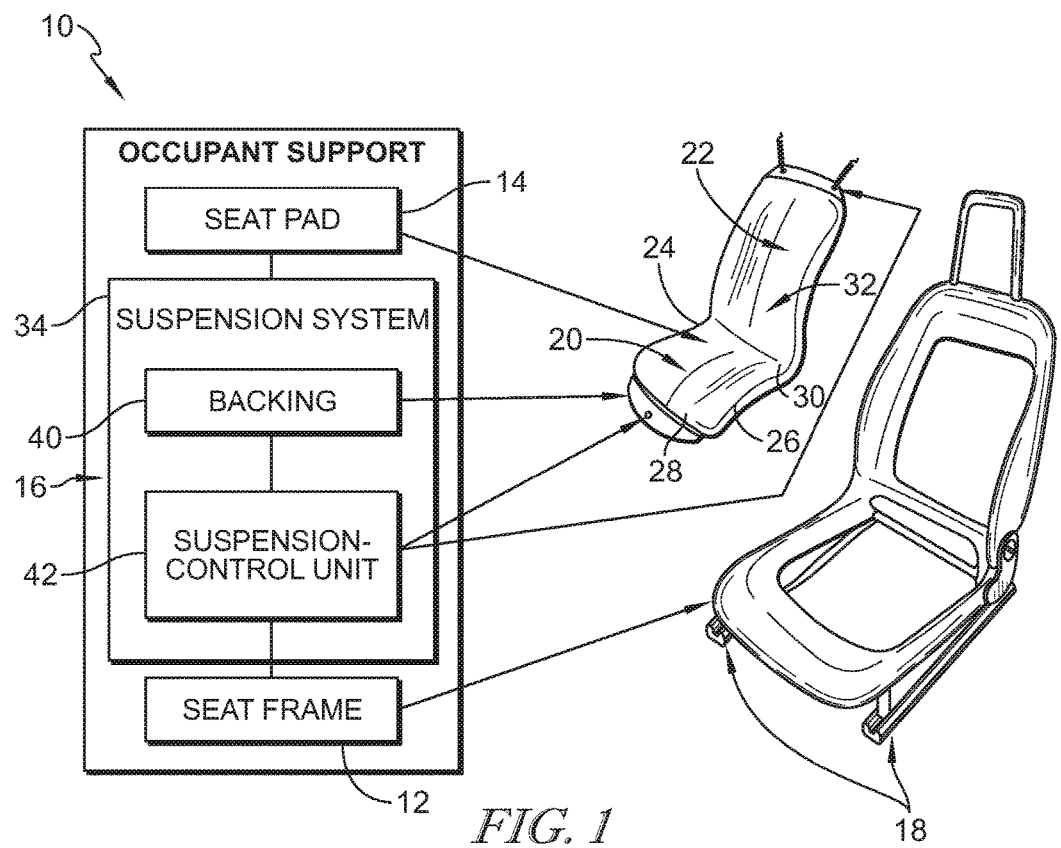
FIG. 1 is a perspective and diagrammatic view of an occupant support in accordance with the present disclosure showing that the occupant support includes a seat frame, a seat pad, and a suspension system coupled between the seat frame and the seat pad to provide relative movement between the seat frame and the seat pad during acceleration of the seat frame to reduce an acceleration of an occupant of the occupant support and minimize motion sickness.

Occupant supports 10, 210 adapted for use in a vehicle are shown in FIGS. 1-8 and 9-13. Occupant supports 10, 210 are configured to minimize motion sickness of an occupant supported by occupant support 10, 210. In accordance with the present disclosure, motion sickness may be minimized by reducing the magnitude of acceleration forces experienced by the occupant due to vehicle motion in the fore-and-aft and lateral axes. Motion sickness may result from a discrepancy between what our eyes perceive compared to what our body experiences (biological accelerometers: vestibular system, somatic, visceral).

Occupant supports 10, 210 allow the occupant to move with a seat pad 14 laterally and fore and aft relative to a seat frame 12 included in the occupant support 10, 210 to more closely match the motion of the acceleration instead of remaining relatively static as suggested in FIGS. 2, 5-7, and 11-13. As a result, the magnitude of the acceleration forces experienced by the occupant is reduced. This may also be referred to as G-force dampening.

Occupant support 10 includes seat frame 12, seat pad 14, and a suspension system 16 as shown in FIGS. 1-7. Seat frame 12 is adapted to couple with a floor of the vehicle for movement with the vehicle. Seat pad 14 is coupled with seat frame 12 for movement with seat frame 12. Suspension system 16 provides means for facilitating relative movement between seat pad 14 and seat frame 12 in response to an acceleration of seat frame 12 to reduce at least one of lateral acceleration and fore and aft acceleration of the occupant during acceleration of seat frame 12 so that motion sickness experienced by the occupant is minimized as suggested in FIGS. 2 and 5-7.

Seat frame 12 is configured to couple occupant support 10 with the vehicle as suggested in FIG. 1. In the illustrative embodiment, seat frame 12 includes a plurality of mounting rails 18 as shown in FIG. 1. In other embodiments, seat frame 12 includes a pad system. Seat frame 12 is coupled to a floor of the vehicle in the illustrative embodiment. In other embodiments, seat frame 12 is coupled to a shell arranged to extend around seat 14 as suggested in FIG. 9. Seat frame 12 moves with the vehicle such that acceleration of the vehicle is applied to seat frame 12.

Figure 2:
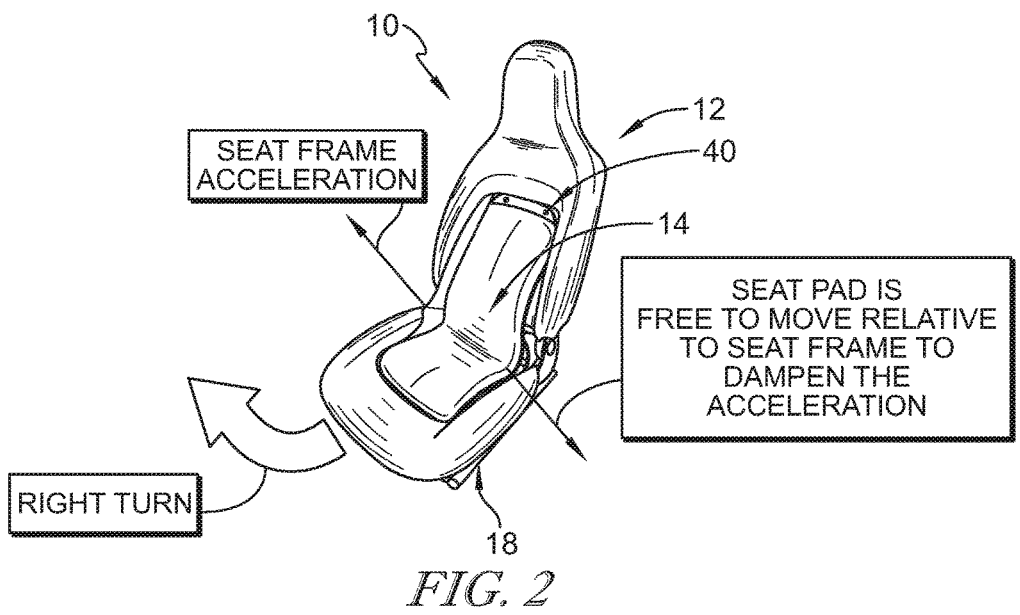
FIG. 2 is a view similar to FIG. 1 suggesting that the seat pad is free to move relative to the seat frame to dampen the acceleration and suggesting that during a right turn the seat pad is configured to move relative to the seat frame in the opposite direction of the seat frame acceleration force.
Figure 3:
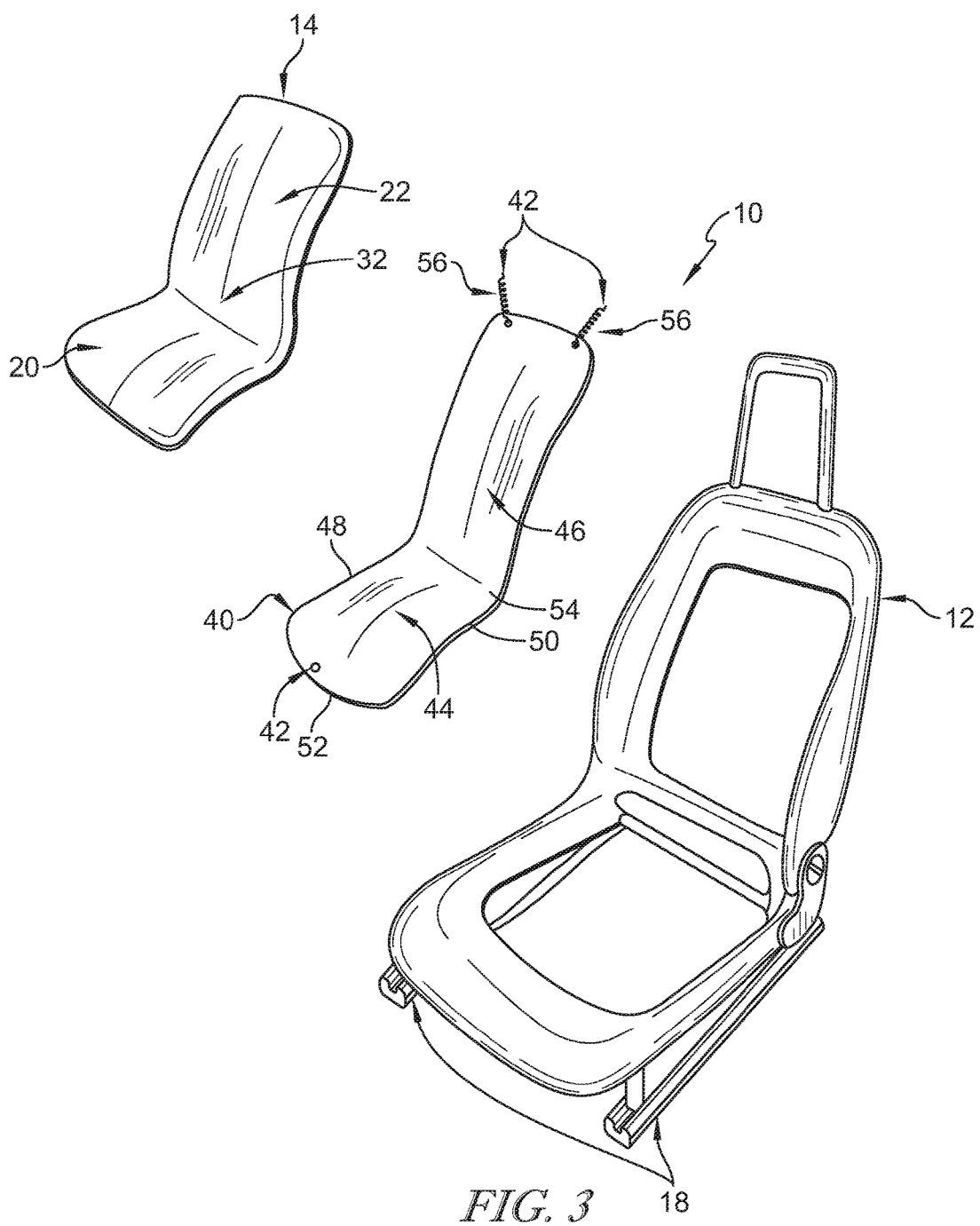
FIG. 3 is an exploded assembly view of the occupant support of FIGS. 1 and 2 showing that the occupant support includes, from left to right, the seat pad, the suspension system including a backing and suspension-control unit, and the seat frame.

Seat pad 14 includes a seat bottom 20 and a seat back 22 as shown in FIGS. 1-3. Seat bottom 20 is adapted to support thighs of the occupant and seat back 22 is adapted to support the back and shoulders of the occupant. Seat bottom 20 includes a left lateral side 26, a right lateral side 24 spaced apart from left lateral side 26, a fore end 28 and an aft end 30 spaced apart from fore end 28. Seat back 22 is arranged to extend upwardly and away from aft end 30 of seat bottom 20.

Seat bottom 20 and seat back 22 cooperate to define a support surface 32 adapted to support the occupant of occupant support 10 thereon. Support surface 32 is defined by a trim of seat 14 in the illustrative embodiment. Support surface 32 is configured to move relative to seat frame 12 to mitigate motion sickness. Support surface 32 may move relative to seat frame 12 due to movement of seat bottom 20. Support surface 32 may move relative to seat frame 12 in response to movement of support surface 32 relative to seat bottom 20, for example, due to an adjustable seat cushion.

Suspension system 16 couples seat bottom 20 with seat back 22 so that seat 14 moves with seat frame 12 and vehicle as suggested in FIG. 1. Suspension system 16 facilitates relative movement between support surface 32 of seat 14 and seat frame 12 in response to an acceleration of seat frame 12 to reduce the peak of magnitude of at least one of lateral acceleration and fore-and-aft acceleration of the occupant during acceleration of seat frame 12 so that motion sickness experienced by the occupant is minimized. In some embodiments, motion-sickness mitigation means 16 reduces vibrations of about 0.2 to about 0.4 Hertz. In some embodiments, motion-sickness mitigation means 16 reduces the peak magnitude of accelerations of about 0.1 to about 0.5 Hertz.

Suspension system 16 includes a backing 40 and suspension-control unit 42 as shown in FIG. 1. Backing 40 is adapted to couple with seat pad 14 for movement with seat pad 14 and is configured to freely rotate with seat pad 14 relative to seat frame 12 in response to an acceleration of seat frame 12. Suspension-control unit 42 is coupled to backing 40 and seat frame 12 for movement with seat frame 12.

In one example, an occupant of occupant support 10 sits in an upright position relative to an axis A during steady-state movement of a vehicle where occupant support 10 is mounted. Suspension system 16 allows for backing 40 to move seat pad 14 toward a left side of seat frame 12 during a right turn of the vehicle to lean the occupant toward a right side of seat frame 12 so that the effects from the acceleration observed by the occupant are reduced to minimize a potential for the occupant to become motion sick.

Backing 40 includes a bottom support 44 and a back support 46 as shown in FIG. 3. Bottom support 44 is adapted to support thighs of the occupant and back support 46 is adapted to support back and shoulders of the occupant. Bottom support 44 includes a left lateral side 48, a right lateral side 50 spaced apart from left lateral side 48, a fore end 52 and an aft end 54 spaced apart from fore end 52. Illustratively, bottom support 44 is coupled with seat frame 12 at a pivot point 66 about which backing 40 rotates relative to seat frame 12. Back support 46 is arranged to extend upwardly and away from aft end 54 of bottom support 44. Illustratively, bottom support 44 and back support 46 are integrally formed and flexible. Backing 40 may be spaced apart from seat frame 12.

Figure 8:
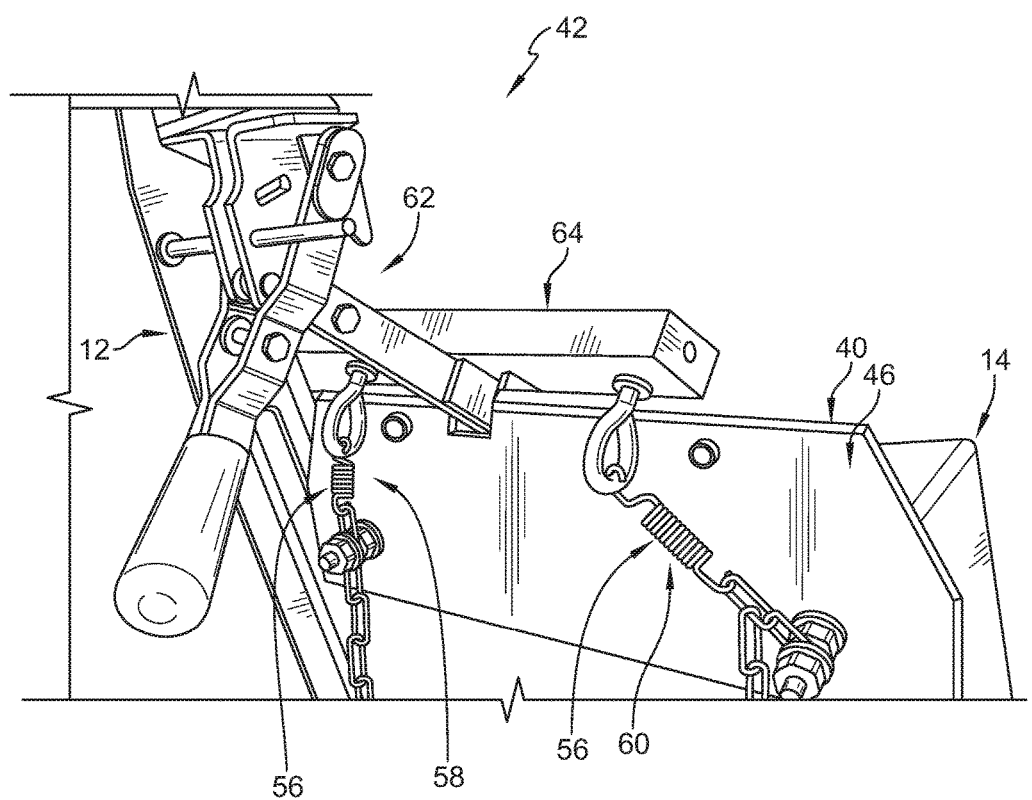
FIG. 8 is a perspective view of the suspension-control unit included in the suspension system shown in FIG. 1 showing that the suspension-control unit includes a bias-member unit which includes an actuator and a mount bar configured to permit movement of the seat pad relative to the seat frame.

Suspension-control unit 42 includes a bias-member unit 56 coupled with seat frame 12 and backing 40 as shown in FIG. 8. Illustratively, bias-member unit 56 is coupled to back support 46 included in backing 40. Backing 40 is moveable from a rest position to a dampening position during acceleration of seat frame 12 and bias-member unit 56 is configured to bias backing 40 towards the rest position. In the illustrative embodiment, bias-member unit 56 is coupled to top corners of back support 46 so that backing 40 may freely rotate around pivot point 66 of the seat frame 12 and bottom support 44 as suggested in FIGS. 4 and 5. In some embodiments, backing 40 includes a body and a perimeter edge defined around the body and suspension-control unit 42 is configured to allow the perimeter edge of backing 40 to move relative to seat frame 12 in response to the acceleration of seat frame 12.

Bias-member unit 56 includes a first bias member 58, a second bias member 60 spaced apart from first bias member 58, an actuator 62, and a mount bar 64 coupled to actuator 62 as shown in FIG. 8. First bias member 58 and second bias member 60 are coupled with seat frame 12 and back support 46 in backing 40. Actuator 62 is coupled to seat frame 12 and mount bar 64. Mount bar 64 is spaced apart from seat frame 12 to define a damper gap between mount bar 64 and seat frame 12. Bias member 58, 60 is coupled to mount bar 64 and back support 46 included in backing 40. Actuator 62 is configured to move mount bar 64 relative to seat frame 12 to vary a size of the damper gap.

Figure 5:
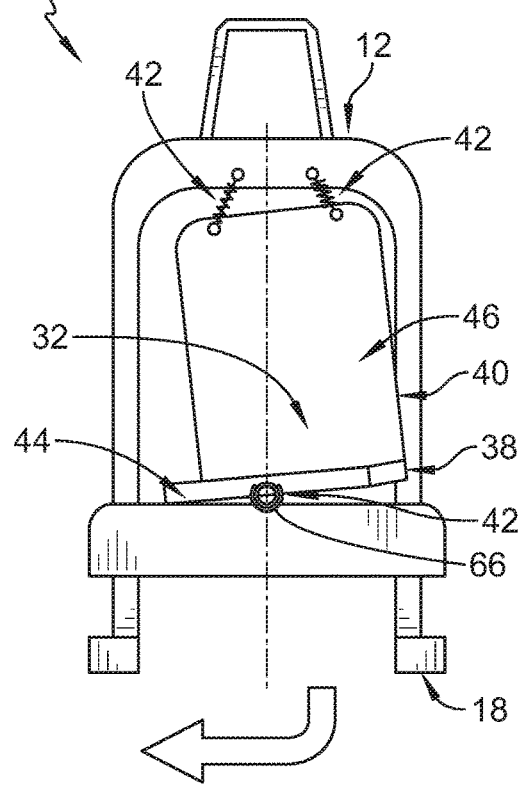
FIG. 5 is a front elevation view similar to that of FIG. 4 showing the suspension system configured to dampen the acceleration and suggesting that during a right turn the seat pad is configured to move relative to the seat frame in the opposite direction of the seat frame acceleration force.

Backing 40 includes left lateral side 26 and right lateral 28 side spaced apart from the left lateral side 26 as shown in FIG. 1. Backing is configured to rotate from the rest position to the dampening position in response to the acceleration of seat frame 12. Left lateral side 26 is raised and right lateral side 24 is lowered in the dampening position relative to the rest position as shown in FIG. 5. The acceleration may be a right turn acceleration.

Backing includes fore end 28 and aft end 30 side spaced apart from fore end 28 as shown in FIG. 1. Backing 40 is configured to rotate from the rest position to the dampening position in response to the acceleration of seat frame 12. Fore end 28 is raised and aft end 30 is lowered in the dampening position relative to the rest position as suggested in FIG. 7. The acceleration may be an aft direction acceleration.

Figure 6:
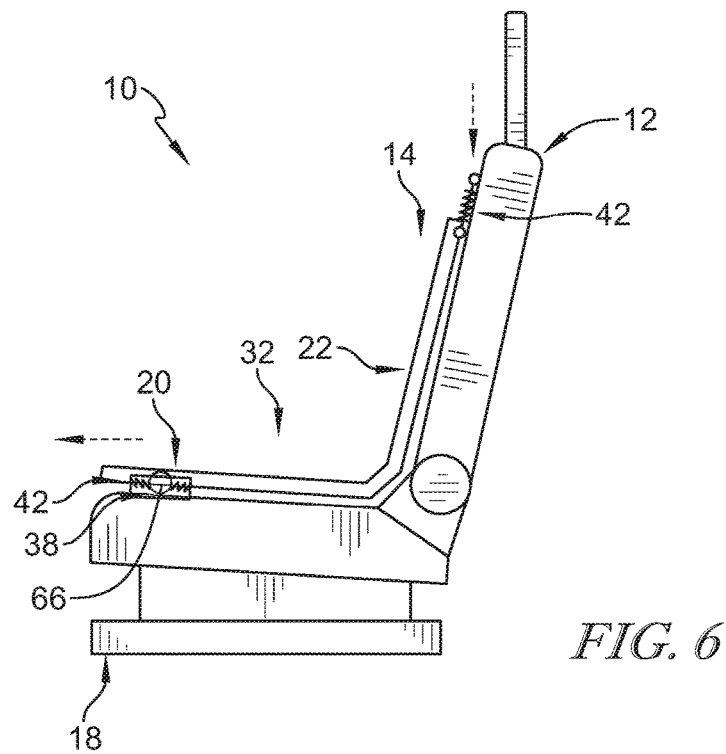
FIG. 6 is a side elevation view of the occupant support of FIG. 1 suggesting that the seat pad is free to move relative to the seat frame to dampen the acceleration when a vehicle accelerates in a forward or backward direction.
Figure 7:
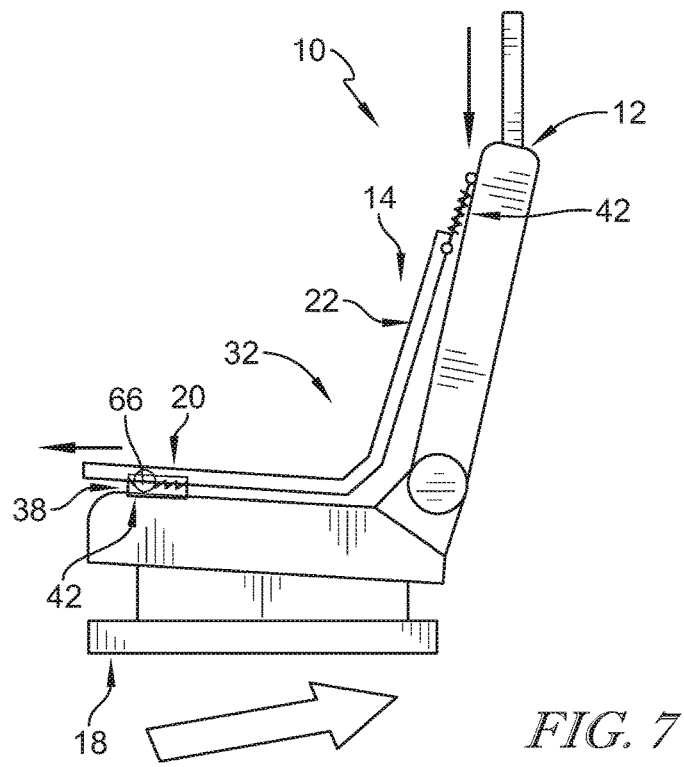
FIG. 7 is a side elevation view similar to that of FIG. 6 showing that the suspension system is configured to dampen the acceleration and suggesting that during a rearward acceleration the seat pad is configured to move relative to the seat frame.

Backing 40 includes an upper end and a lower end spaced apart from the upper end as shown in FIG. 6. Backing 40 is configured to rotate from the rest position to the dampening position in response to the acceleration of seat frame 12. The upper end is moved aft and the lower end is moved forward in the dampening position relative to the rest position as shown in FIG. 7. The acceleration may be the aft direction acceleration.

Figure 4:
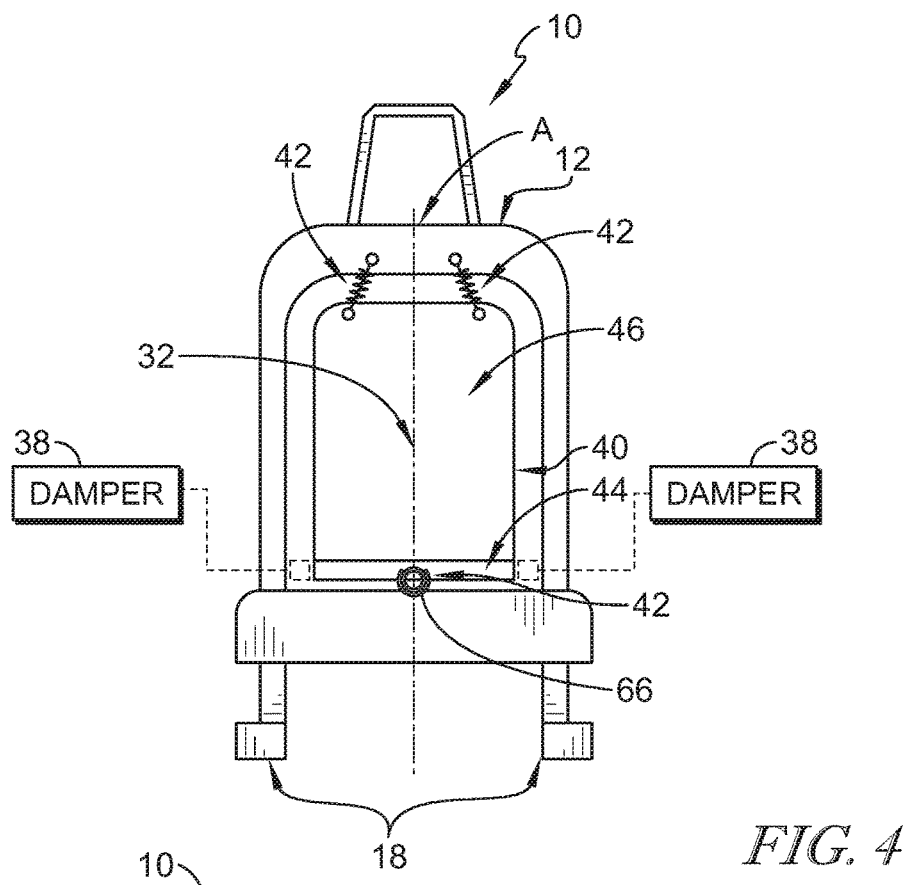
FIG. 4 is a front elevation view of the occupant support of FIG. 1 showing the suspension system configured to dampen the acceleration of the seat frame.

In some embodiments, suspension-control system 42 further includes dampers 38 as shown in FIG. 4. Dampers 38 are coupled to backing 40 and seat frame 12 to control the movement of backing 40 during acceleration of seat frame 12. For example, dampers 38 block backing 40 from coming to an abrupt stop when moving relative to seat frame 12. Dampers 38 may include micro-dampers. Dampers 38 may include bias members. Dampers 38 may include compression springs, air cylinders, padding, friction damper, tuned or controlled mass dampers, elastic bands, magnets, etc. Such devices may have translational and rotational versions and may be passive or active.

A method of using occupant support 10 includes a number of steps. In a first step, seat frame 12 and seat pad 14 are provided. Seat pad 14 defines support surface 32 adapted to support the occupant thereon. In a second step, support surface 32 of seat pad 14 is moved relative to seat frame 12 from a first position to a second position in response to an acceleration of seat pad 14 during acceleration of seat frame 12.

The second step may include translating support surface 32 relative to seat frame 12. The second step may include tilting support surface 32 relative to seat frame 12. The method may further include a third step of moving support surface 32 from the second position to the first position after the acceleration of seat frame 12 is removed.

Another embodiment of an occupant support 210 is shown in FIGS. 9-13. Occupant support 210 is substantially similar to occupant support 10 shown in FIGS. 1-8 and described herein. Accordingly, similar reference numbers in the 200 series indicate features that are common between occupant support 10 and occupant support 210. The description of occupant support 10 is incorporated by reference to apply to occupant support 210, except in instances when it conflicts with the specific description and the drawings of occupant support 210.

Figure 9:
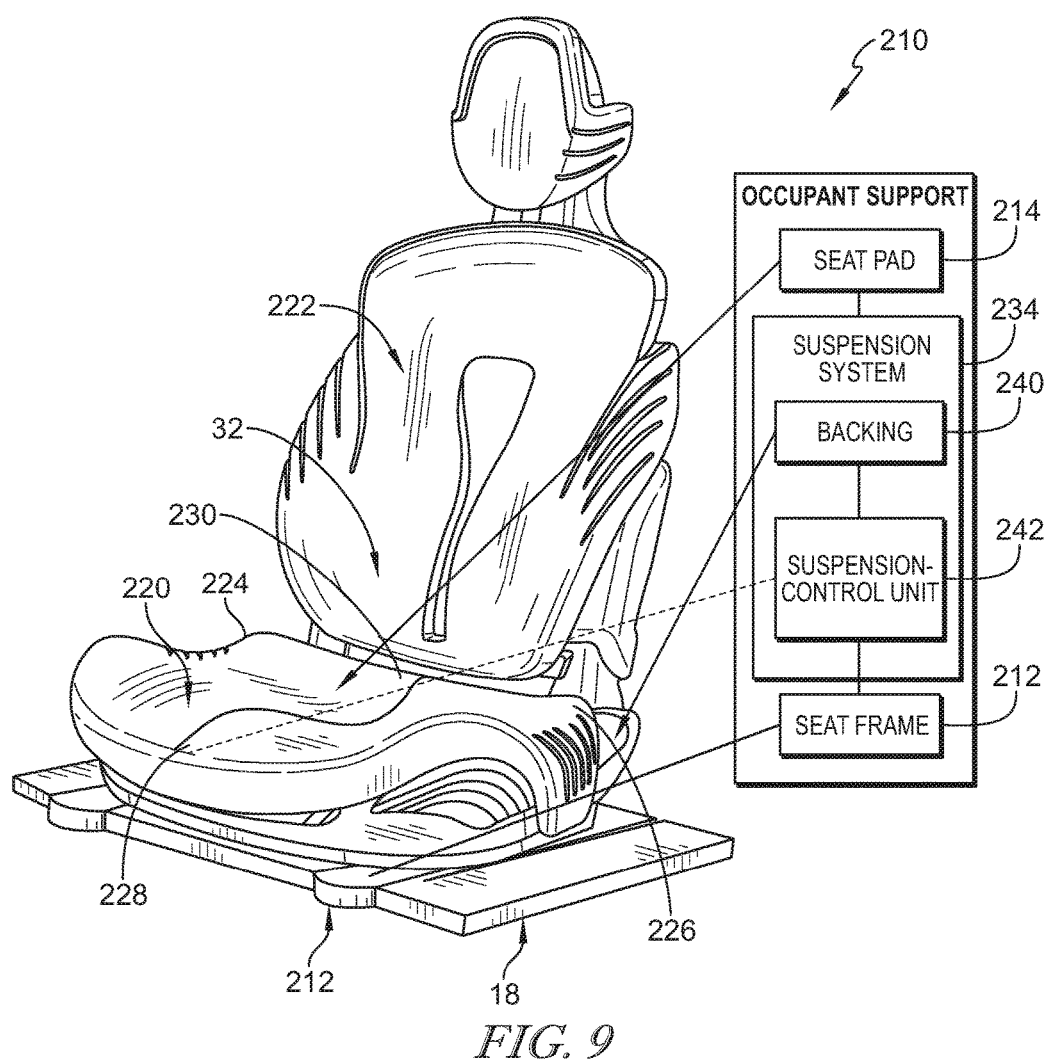
FIG. 9 is a perspective and diagrammatic view of a second embodiment of the occupant support in accordance with the present disclosure showing that the occupant support includes a seat frame, a seat pad, and suspension system coupled between the seat frame and the seat pad.
Figure 10:
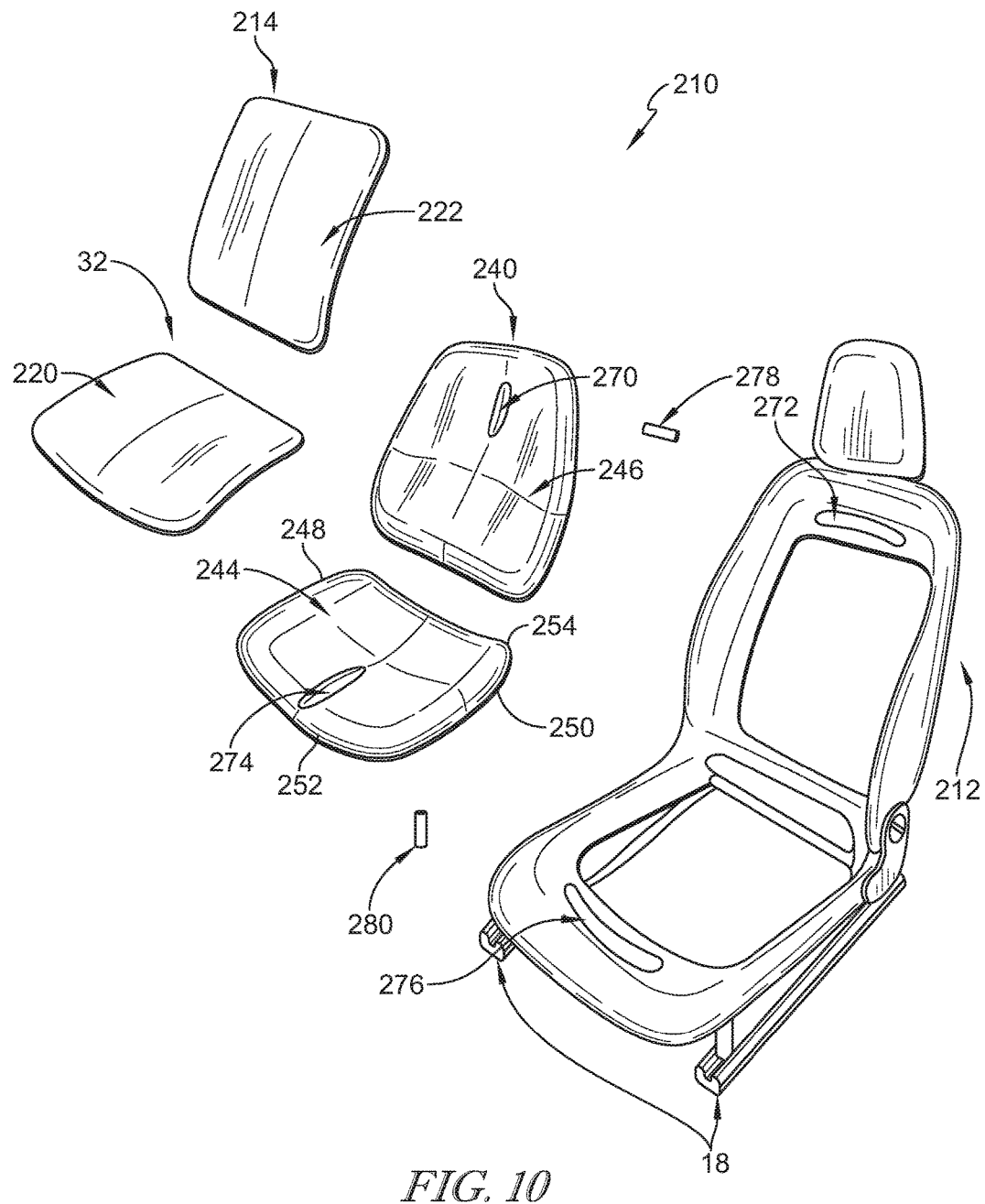
FIG. 10 is an exploded assembly view of the occupant support of FIG. 9 showing that the occupant support includes, from left to right, the seat pad, the suspension system including a backing includes and a first guide track formed in the backing and a second guide track formed in the seat frame, guide pins, and the seat frame.

As shown in FIG. 9, occupant support 210 includes a seat frame 212, a seat pad 214, and a suspension system 216. Suspension system 216 facilitates relative movement between seat pad 214 and seat frame 212 in response to an acceleration of seat frame 212 to reduce at least one of lateral acceleration and fore and aft acceleration of the occupant during acceleration of seat frame 212 so that motion sickness experienced by the occupant is minimized as suggested in FIGS. 11-13.

Figure 11:
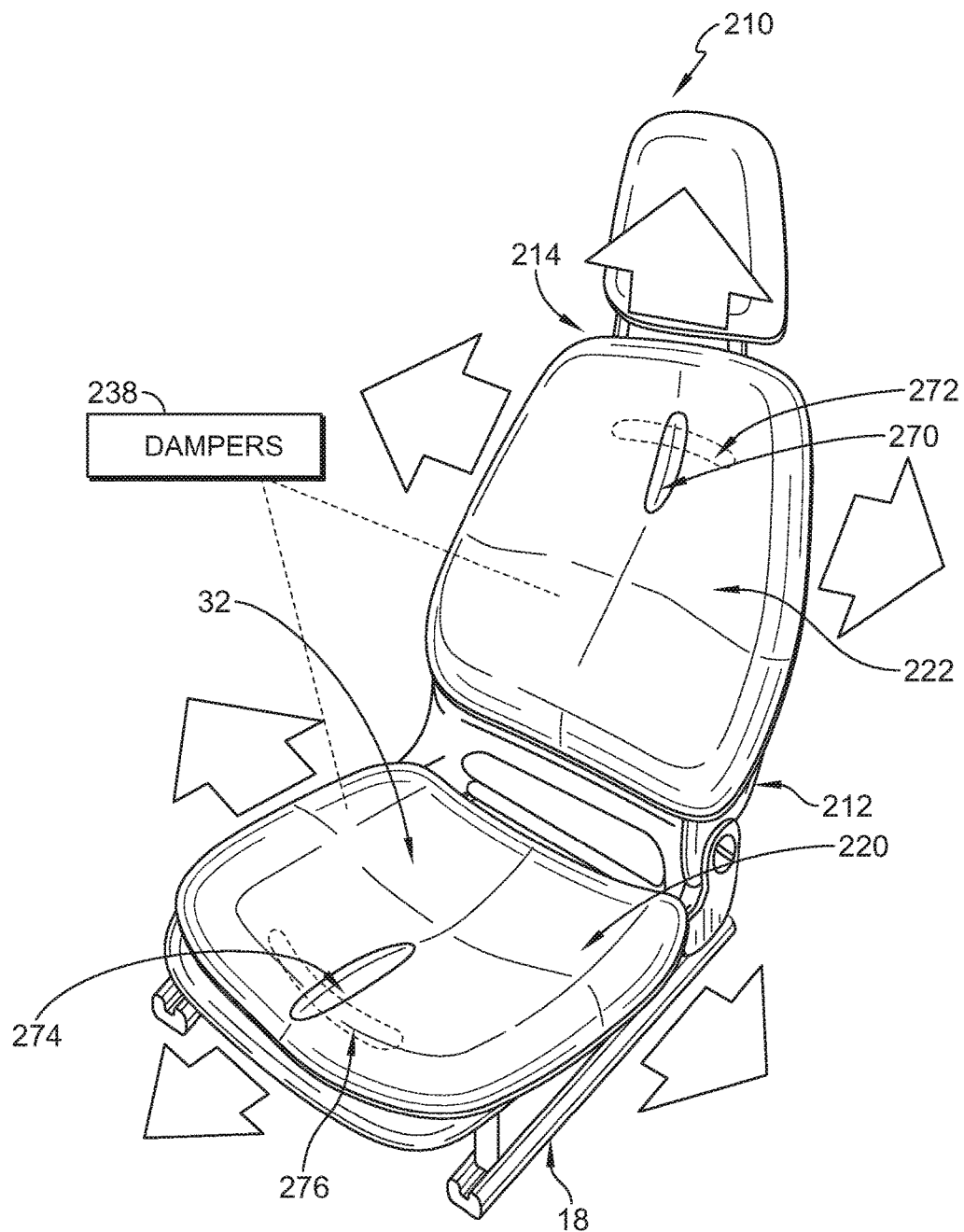
FIG. 11 is a front perspective view of the occupant support of FIG. 9 showing the suspension system configured to dampen the acceleration and suggesting that during acceleration of the vehicle the seat pad is configured to move relative to the seat frame to minimize motion-sickness symptoms felt by the occupant.
Figure 12:
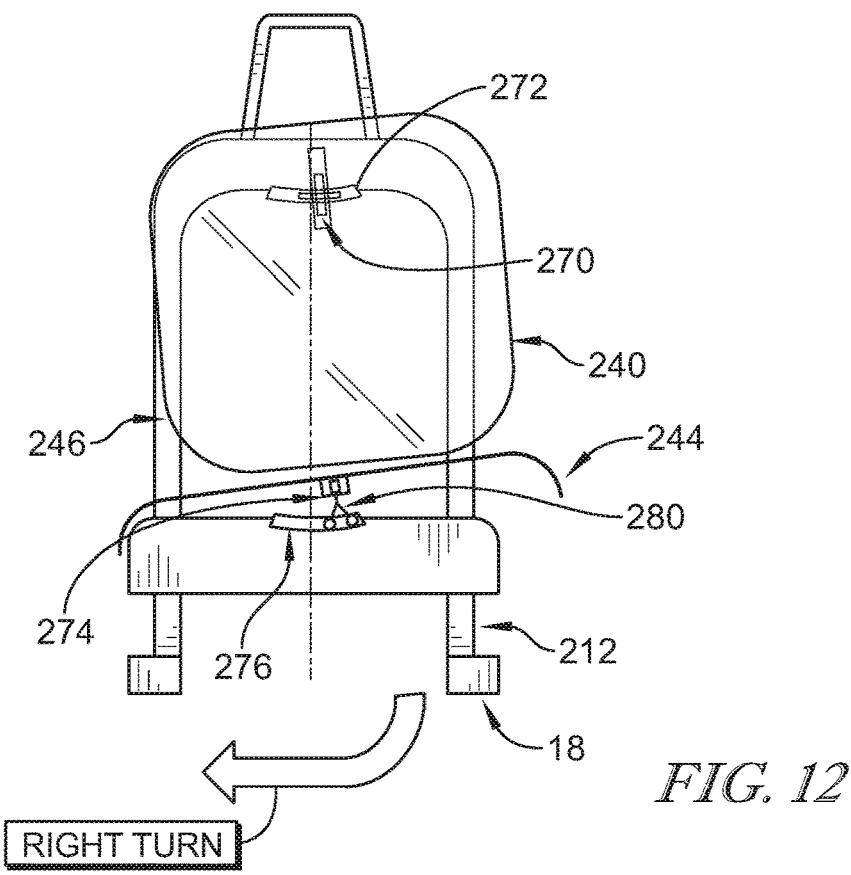
Figure 13:
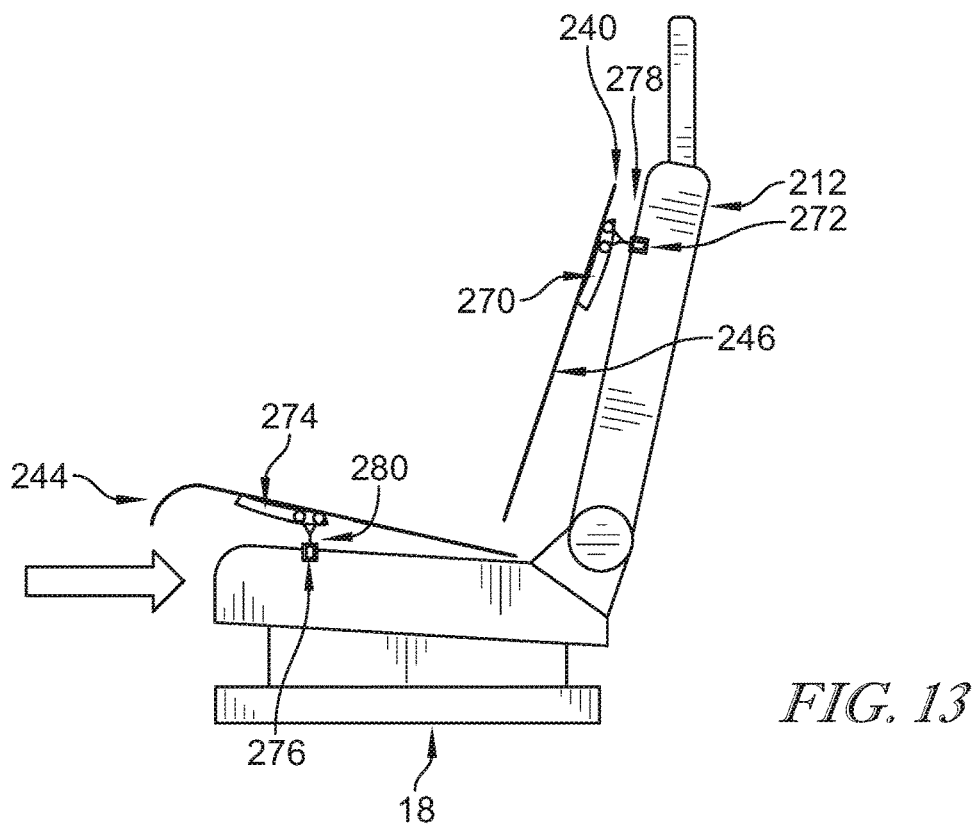
FIG. 13 is a side elevation view of the occupant support of FIG. 9 showing the seat pad, seat frame, and suspension system and that the first guide pin extends into the first track formed in the backing and the second guide track formed in the seat frame and suggesting that during a rearward acceleration of the vehicle the seat pad is configured to move relative to the seat frame to minimize the acceleration experienced by the occupant.

Suspension system 216 includes a baking 240 and a suspension-control unit 242. Baking 240 includes a bottom support 244 and a back support 246. Illustratively, bottom support 244 and back support 246 are rigid. Suspension-control unit 242 is coupled to backing 240 and seat frame 212 for movement with seat frame 212, as shown in FIGS. 11-13. Suspension-control unit 242 further includes guide tracks 270, 272, 274, 276 located in backing 240 and seat frame 212. Guide tracks 270, 272, 274, 276 are configured to receive a guide unit 278, 280 so that backing 240 moves relative to seat frame 212 along paths defined by guide tracks 270, 272, 274, 276. In the illustrative embodiment, guide unit 278, 280 include pins. In other embodiments, guide units include rollers.

Illustratively, guide tracks 270, 272 are located in back support of backing 246 and the back of seat frame 212 so that guide tracks 270, 272 are configured to receive a guide pin 278 and define a path by which backing 250 moves. Support back guide track 270 extends generally perpendicular to seat frame back guide track 272 so that back guide pin 278 extends through both support back guide track 270 and seat frame back guide track 272. Guide track 270 extends generally perpendicular to guide track 272.

Illustratively, additional guide tracks 274, 276 are located in bottom support of backing 240 and the bottom of seat frame 212 so that guide tracks 274, 276 are configured to receive guide pin 280 and define a path by which backing 240 moves. Support bottom guide track 274 extends generally perpendicular to seat frame bottom guide track 276 so that bottom guide pin 280 extends through both support bottom guide track 274 and seat frame bottom guide track 276. Guide track 274 extends generally perpendicular to guide track 276.

In some embodiments, suspension-control unit 242 further includes dampers 238 as shown in FIG. 11. Dampers 238 are coupled to backing 240 and seat frame 212 to control the movement of backing 240 during acceleration of seat frame 212. For example, dampers 238 block backing 240 from coming to an abrupt stop when moving relative to seat frame 212. Dampers 238 may include micro-dampers. Dampers 238 may include bias members. Dampers 238 may include compression springs, air cylinders, padding, friction damper, tuned or controlled mass dampers, elastic bands, magnets, etc. Such devices may have translational and rotational versions and may be passive or active.

In illustrative embodiments, suspension system 16 may be used with a vehicle seat to minimize motion sickness experienced by an occupant resting on vehicle seat. Suspension system 16 may include one or more gravity dampers (or G dampers).

Motion sickness is a condition which may include a number of associated symptoms. The rise of autonomous vehicles may lead to an increase in the number of occupants that experience motion sickness. Many activities unrelated to driving may have a worsening effect on the frequency and severity of motion sickness symptoms. For example, motion sickness may occur when attempting to read or watch screen content while moving. It is desired to address motion sickness and minimize or eliminate the effects of its symptoms.

Various symptoms of motion sickness that may be alleviated by one or more embodiments of the present disclosure include cold sweating, increased salivation, pallor (skin color), drowsiness, headache, severe pain, nausea, vomiting, and sopite syndrome (which includes profound drowsiness and persistent fatigue which may result in hours or days of boredom, apathy, increased irritability, and personality changes). The symptoms mentioned above may have a response dependent upon the provocativeness of stimulation, relative susceptibility of the person, and prior experiences.

Results from motion sickness field testing show an abrupt duration of less than two seconds in changes of x-G forces and y-G forces. G force loading was less than 1 G in each axis with rapid combined x-G forces and y-G forces provoking motion sickness within two seconds. Each test subject experienced high motion sickness for about half of the testing time and each subject noted that they would not have continued reading as long as they did during the test. An S-curve including slight rolling hills through a dark tunnel provoked motion sickness in some cases. Test subjects experienced some level of residual motion sickness symptoms following testing.

The present disclosure provides means to mitigate or eliminate motion sickness by reducing the effects of acceleration or deceleration and reducing or controlling vehicle vibration levels either within the vehicle suspension or within the seating system. A gravity damper (or G damper) system may provide partial car motion cancellation relative to the occupant, may absorb inertial forces to provide a constant state to the body of occupant, and may reduce or override uncomfortable vibrations that may result in motion sickness.

Anyone may be vulnerable to the effects of motion sickness. It may occur even for blind people that experience visual or other sensory-dependent adaptation to the moving environment. Although complex interactions may not be fully understood because there are significant individual variations, there may be vestibular inputs and visceral inputs due to motion, and there may be a relationship between the head and the corresponding torso movements of a person. The sensory conflict theory provides that motion sickness may be caused by a discrepancy between the expected and actual sensory feedback. The sensory conflict theory may be the most widely-accepted theory and differentiates between somatic (muscles and joints) and visceral (gut) receptors which may act as biological accelerometers.

The suspension system for mitigating motion-sickness is based on Newton Laws of Motion. When a force is applied on a freely moving object in order to accelerate, decelerate, or change its direction, an equal inertial force acts on the object in an opposite direction of the applied force. An occupant can experience or feel that inertial force, which is an indicator of motion for their vestibular system.

The inertial force is proportional to the acceleration, so reducing the peak of magnitude of the acceleration decreases the inertia force. Decoupling the occupant support from the rest of the vehicle, may allow it to freely move in the opposite direction of the acceleration of the vehicle, thus reducing the peak of magnitude of the acceleration sustained by the occupant body and, as a result, the inertial force and the perception of motion. Following this principle, this disclosure may enable the occupant support 10, 210 to have a certain degree of free motion relatively to the vehicle frame, to enable it to move in the opposite direction of the vehicle acceleration.

This degree of free motion may be controlled via some dampening solution, to avoid an abrupt stop when reaching the limit of the free motion. The direction of free motion may also be controlled to maximize the occupant stability during the movement. Enabling the occupant body to describe the trajectory of a pendulum may create a centrifugal force (perpendicular to the inertial force), promoting stability.

Occupant support 10 may include seat frame 12 connected to suspension system 16 and seat pad 14 connected to suspension system 16. Seat pad 14 and suspension system 16 may have first and second surface connection features for mounting suspension system 16 to seat frame 12. A passive adjustment means may be provided between each pair of surface connection features. The passive adjustment means may allow the occupant to experience more gradual acceleration changes to avoid motion sickness. A stabilization component may be connected to seat frame 12 at a forward location of the seat bottom with respect to the seat back.

The invention claimed is:

1. An occupant support for use in a vehicle, the occupant support comprising
a seat frame adapted to couple with the vehicle for movement with the vehicle,
a seat pad coupled with the seat frame to provide a comfortable support interface for an occupant of the occupant support, and
a suspension system configured to provide relative movement between the seat pad and the seat frame, the suspension system including a backing coupled with the seat pad for movement with the seat pad and a suspension-control unit coupled to the seat frame and the backing to cause at least a portion of the backing to be free to rotate with the seat pad relative to the seat frame,
wherein the backing includes a bottom support and a back support coupled to the bottom support to extend upwardly away from the bottom support and the bottom support and the back support are integrally formed and flexible.

2. The occupant support of claim 1, wherein the bottom support is coupled with the seat frame at a pivot point about which the backing rotates relative to the seat frame.

3. The occupant support of claim 2, wherein the suspension-control unit includes a bias-member unit coupled with the seat frame and the back support included in the backing.

4. An occupant support for use in a vehicle, the occupant support comprising
a seat frame adapted to couple with the vehicle for movement with the vehicle,
a seat pad coupled with the seat frame to provide a comfortable support interface for an occupant of the occupant support, and
a suspension system configured to provide relative movement between the seat pad and the seat frame, the suspension system including a backing coupled with the seat pad for movement with the seat pad and a suspension-control unit coupled to the seat frame and the backing to cause at least a portion of the backing to be free to rotate with the seat pad relative to the seat frame,
wherein the suspension-control unit includes a bias-member unit coupled with the seat frame and the backing, the backing is movable from a rest position to a dampening position, and the bias-member unit biases the backing toward the rest position.

5. The occupant support of claim 4, wherein the backing includes a bottom support and a back support coupled to the bottom support to extend upwardly away from the bottom support, the bias-member unit includes a first bias member and a second bias member spaced apart from the first bias member, and the first bias member and the second bias member are coupled with the seat frame and the back support included in the backing.

6. The occupant support of claim 5, wherein the bias-member unit further includes an actuator and a mount bar, the actuator is coupled to the seat frame and the mount bar, the mount bar is spaced apart from the seat frame to define a damper gap therebetween, the first bias member is coupled to the mount bar and the back support included in the backing, and the actuator is configured to move the mount bar relative to the seat frame to vary a size of the damper gap.

7. An occupant support for use in a vehicle, the occupant support comprising
 a seat frame adapted to couple with the vehicle for movement with the vehicle,
 a seat pad coupled with the seat frame to provide a comfortable support interface for an occupant of the occupant support, and
 a suspension system configured to provide relative movement between the seat pad and the seat frame, the suspension system including a backing coupled with the seat pad for movement with the seat pad and a suspension-control unit coupled to the seat frame and the backing to cause at least a portion of the backing to be free to rotate with the seat pad relative to the seat frame,
 wherein the backing includes a rigid bottom support and a rigid back support configured to move independent of the rigid bottom support,
 wherein the suspension-control unit includes a first support track formed in the rigid bottom support, a first frame track formed in the seat frame, and a first guide unit that extends into the first support track and the first frame track to allow the rigid bottom support to move relative to the seat frame along paths defined by the first support track and the first frame track.

8. The occupant support of claim 7, wherein the first support track extends generally perpendicular to the first frame track.

9. The occupant support of claim 7, wherein the suspension-control unit further includes a third guide track formed in the back support, a fourth guide track formed in the seat frame, and a second guide unit that extends into the third guide track and the fourth guide track to allow the back support to move relative to the seat frame along paths defined by the third guide track and the fourth guide track.

10. The occupant support of claim 1, wherein the backing includes a body and a perimeter edge defined around the body and the suspension-control unit is configured to allow the perimeter edge of the backing to move relative to the seat frame.

11. The occupant support of claim 10, wherein the suspension system further includes a bias member coupled to the backing and the seat frame.

12. The occupant support of claim 1, wherein the backing includes a left lateral side and a right lateral side spaced apart from the left lateral side, the backing is configured to rotate from a rest position to a dampening position, and the left lateral side is raised and the right lateral side is lowered in the dampening position relative to the rest position.

13. The occupant support of claim 12, wherein the backing includes a fore end and an aft end side spaced apart from the fore end, the backing is configured to rotate from a rest position to a dampening position, and the fore end is raised and the aft end is lowered in the dampening position relative to the rest position.

14. The occupant support of claim 1, wherein the backing includes a fore end and an aft end side spaced apart from the fore end, the backing is configured to rotate from a rest position to a dampening position, and the fore end is raised and the aft end is lowered in the dampening position relative to the rest position.

15. The occupant support of claim 1, wherein the backing includes an upper end and a lower end spaced apart from the upper end, the backing is configured to rotate from a rest position to a dampening, and the upper end is moved aft and the lower end is moved forward in the dampening position relative to the rest position.

16. The occupant support of claim 15, wherein the backing includes a left lateral side and a right lateral side spaced apart from the left lateral side, the backing is configured to rotate from a rest position to a dampening position, and the left lateral side is moved forward and the right lateral side is moved aft in the dampening position relative to the rest position.

17. The occupant support of claim 1, wherein the backing is spaced apart from the seat frame.

* * * * *